United States Patent Office

2,870,125
Patented Jan. 20, 1959

2,870,125

EPOXIDIZED POLYETHYLENICALLY UNSATURATED POLYCARBOXYLIC ACIDS, DERIVATIVES THEREOF AND METHOD FOR PRODUCING THE SAME

George B. Payne and Curtis W. Smith, Berkeley, Calif., assignors to Shell Development Company, New York, N. Y., a corporation of Delaware No Drawing. Application December 8, 1953
Serial No. 397,012

11 Claims. (Cl. 260—78.3)

This invention relates to a new class of epoxy-substituted organic compounds and to a method for their preparation. More particularly, the invention relates to certain novel epoxy-substituted polycarboxylic acids and their derivatives, to their preparation, and to the use of the acids and derivatives, particularly as pesticides and herbicides and as stabilizers and flexibilizing agents for surface coating compositions.

Specifically, the invention provides new and particularly useful epoxidized polyethylenically unsaturated polycarboxylic acids wherein at least one internal ethylenic group in the acid molecule, not more than 6 carbon atoms removed from one of the carboxyl groups, has been converted to an epoxy group, and derivatives of these epoxidized acids, such as their acid halides, ester, salts and amides. These epoxidized acids and derivatives are preferably prepared according to the present invention by treating the corresponding polyethylenically unsaturated polycarboxylic acids or derivatives thereof with an organic peracid, such as peracetic acid.

The invetnion further provides compositions, such as pesticidal compositions and coating compositions, containing the above-described epoxidized polyethylenically unsaturated acids and derivatives.

Polymers of these epoxidized acids and derivatives obtained by polymerizing the acids and derivatives by themselves or with other epoxy-substituted materials and/or ethylenically unsaturated materials are also provided by the present invention.

It is an object of the invention to provide a new class of epoxy-substituted organic compounds. It is a further object to provide certain novel epoxidized polyethylenically unsaturated polycarboxylic acids, and a method for their preparation. It is a further object to provide valuable derivatives of epoxy-substituted polycarboxylic acids. It is a further object to provide certain novel epoxidized polyethylenically polycarboxylic acids and derivatives which are particularly useful as pesticides and herbicides. It is a further object to provide derivatives of epoxidized polyethylenically unsaturated polycarboxylic acids, and particularly the ester derivatives of the polyepoxy-substituted polycarboxylic acids, which are useful as stabilizers for resins and particularly for halogen-containing polymers. It is a further object to provide derivatives of these acids which are good flexibilizing agents for coating compositions. It is a further object to provide polyepoxy-substituted polycarboxylic acid derivatives which are useful as lubricants and crease- and shrink-proofing agents for textile fabrics. It is a further object to provide novel epoxy-substituted polycarboxylic acids and derivatives which are useful in the preparation of improved resins and polymers. Other objects and advantages of the invention will be apparent from the following detailed description thereof.

It has now been discovered that these and other objects may be accomplished by novel epoxidized polyethylenically unsaturated polycarboxylic acids wherein at least one internal ethylenic group in the acid molecule, not more than 6 carbon atoms removed from one of the carboxyl groups, has been converted to an epoxy group, and derivatives of these acids, such as their acid halides, esters, salts and amides. Due to their special structural configuration, these novel products possess many unusual and unexpected properties which make them particularly useful and valuable in industry. The novel epoxidized polyethylenically unsaturated polycarboxylic acids are, for example, relatively stable and may be subjected to various reactions without effecting the epoxy group or groups. These acids are, for example, valuable additives for herbicide and pesticide compositions and are especially active as additives for insecticidal compositions. The new acids also find use in the formation of improved alkyd-type resins.

The novel derivatives of the epoxidized polyethylenically unsaturated polycarboxylic acids, and particularly the ester and amide derivatives, are valuable as stabilizers for resins and particularly halogen-containing polymers, as the endow the resulting compositions with improved resistance to decomposition by heat and light. The esters also are promising additives for coating compositions and the cellulose derivatives, such as nitrocellulose. They are particularly valuable for this application as they have been found to have excellent solubility and compatibility characteristics with the materials used in the preparation of such coating compositions, and in addition, give coatings having excellent flexibility and stability. The novel ester derivatives of the polyepoxy-substituted polycarboxylic acids are also particularly valuable as crease- and shrink-proof agents for textile fabrics as sheets treated with these materials have a soft hand, good crease and wrinkle resistance and improved strength.

The novel acids of the invention are obtained by epoxidizing polyethylenically unsaturated polycarboxylic acids which have at least one ethylenic group in an internal position, i. e., an ethylenic group the carbon atoms of which are attached to other carbon atoms, and have the aforedescribed ethylenic group no more than 6 carbon atoms removed from one of the carboxyl groups. These acids may contain 2,3,4 or more ethylenic groups and 2,3,4 or more carboxyl groups. Preferred acids are those containing 2 to 3 ethylenic groups and 2 to 4 carboxyl groups. The preferred acids also have the ethylenic groups at least one carbon atom removed from the carboxyl groups. Examples of these acids include, among others, 8,12-eicosadienedioic acid, 8-vinyl-10-octadecenedioic acid, 7,11-octadecadienedioic acid, 7-vinyl-12-hexadecenedioic acid, 10,11-diethyl-8,12-eicosadienedioic acid, 6,10-hexadecadienedioic acid, 10-vinyl-7-hexadecenedioic acid, 6,10-octadecadienylsuccinic acid, 2-(5,10-octadecadienyl)4,6-hexanedioic acid, 3,5-cyclohexadiene-1,2-dicarboxylic acid, 3-hexyl-3,5-cyclohexadiene-1,2-dicarboxylic acid, 3-chloro-3,5-cyclohexadiene-1,2-dicarboxylic acid, 5,8-hexadecadienedioic acid, 4,8-hexadecadienylsuccinic acid, 3,7-decadiene-1,1,10,10-tetracarboxylic acid, 3,7-decadiene-1,1,10-tricarboxylic acid, 1,1,2,3,4,5-hexa(beta-carboxyethyl)cyclopentadiene, and 1,4-dihydronaphthalene-1,4-dicarboxylic acid.

One preferred group of acids that may be epoxidized according to the present invention comprises the cyclic polyethylenically unsaturated dicarboxylic acids obtained by condensing conjugated open-chain or cyclic diethylenically unsaturated compounds such as butadiene and cyclopentadiene with chloromaleic acid and dehydrohalogenating the resulting product according to the process shown in U. S. 2,391,226. Maleic anhydride, of course, can be used to form the corresponding anhydride and these may also be used in the epoxidation reaction. Examples of these acids and anhydrides include 1,4-cyclohexadiene-1,2-dicarboxylic acid, 6-ethyl-1,4-cyclohexadiene-1,2-dicarboxylic acid, 3-butyl-1,4-cyclohexadiene-1,2-dicarboxylic acid and 3,6-dimethyl-1,4-cyclohexadiene-1,2-dicarboxylic acid.

Other preferred acids are the 3,5-cyclohexadiene-1,2-dicarboxylic acids obtained by hydrolyzing 3-acyloxy-1,2,3,6-tetrahydrophthalic acids or anhydrides by the method shown in U. S. 2,632,011. Examples of these acids include 3-methyl-3,5 - cyclohexadiene - 1,2 - dicarboxylic acid, 1,2-dimethyl-3,5-cyclohexadiene-1,2 - dicarboxylic acid, and 6-butyl-3,5-cyclohexadiene - 1,2 - dicarboxylic acid.

Another preferred group of acids that may be epoxidized according to the present invention comprises the substituted succinic acids obtained by reacting a halogenated olefinic compound, such as chloroctadecene with maleic acid according to procedures known to the art, such as that disclosed in U. S. 2,055,456 and U. S. 2,294,259, and then dehydrohalogenating the resulting product. Maleic anhydride, of course, can be used to form the corresponding anhydride and these may also be used in the epoxidation reaction. Examples of these acids and anhydrides include hexadecadienylsuccinic acid, octadecadienylsuccinic acid, nonadecadienylsuccinic acid, and pentadecadienylsuccinic acid.

The particularly preferred unsaturated polycarboxylic acids to be used in the preparation of the novel epoxy-substituted acids, however, are the polyethylenically unsaturated dicarboxylic acids containing at least 18 carbon atoms obtained by treating a cyclic peroxide of special structure with a compound having a conjugated system of double bonds, such as, for example, butadiene or cyclopentadiene, in the presence of a heavy metal capable of existing in several valence forms, such as iron or cobalt. This method of preparation may be exemplified by the following equations showing the preparation of 8,12-eicosadienedioic acid from 1,1'-dihydroxydicyclohexyl peroxide (obtained from cyclohexanone and hydrogen peroxide) and butadiene in the presence of ferrous sulfate:

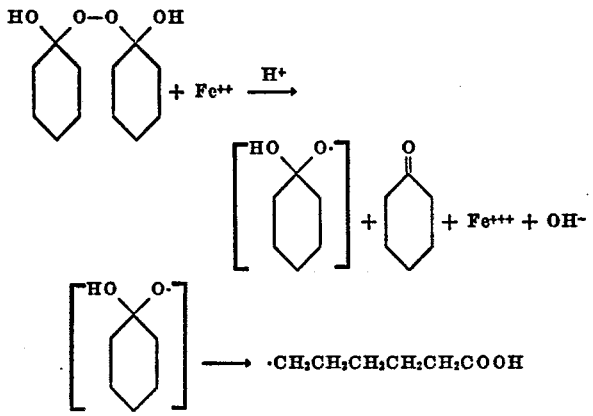

$2 \cdot CH_2CH_2CH_2CH_2CH_2COOH + 2CH_2=CHCH=CH_2 \longrightarrow$
$HOOC(CH_2)_5CH_2CH=CHCH_2CH_2CH=CCH_2(CH_2)_4COOH$ The acid produced by the above process also contains minor quantities, e. g., up to above 25%, of other acids, such as $HOOC(CH_2)_5CH_2CH(CH=CH_2)$—$CH_2CH=CHCH_2(CH_2)_5COOH$.

Particularly advantageous cyclic peroxides to be used in the process are those represented by the formula

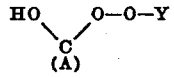

wherein Y is a hydrogen atom, a

radical, or a

radical, and A is a divalent radical containing a chain of no more than 5 carbon atoms between the two free bonds of the radical, and preferably divalent hydrocarbon radicals which may be substituted, if desired, with functional groups, such as hydroxy, nitro, cyano, carboxy, ester, ether and sulfone groups and halogen atoms.

Cyclic peroxide compounds to be used in the above process are preferably obtained by reacting hydrogen peroxide with a cyclic ketone of the formula

wherein A is a divalent radical as described above. These peroxides can be produced as described in Milas, U. S. 2,298,405, the products from equimolar amounts of cyclic ketone and hydrogen peroxide being chiefly the 1-hydroxy-1'-hydroperoxydicycloalkanyl peroxides

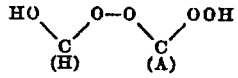

Preferred cyclic peroxides for use in the present process are the 1,1'-dihydroxydicycloalkanyl peroxides

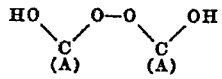

obtainable by the use of two moles of cyclic ketone per mole of hydrogen peroxide.

The A in the above-described formula of the cyclic ketone is preferably unsubstituted methylene groups or methylene groups substituted with methyl, ethyl, propyl, butyl, benzyl, phenyl, cyclohexyl, chloro, bromo, hydroxy, methoxy, keto substituents, and the like. A may also form a part of a phenyl or cyclohexyl ring. Representative examples of such suitable divalent radicals include: —$CH_2CH_2CH_2$—

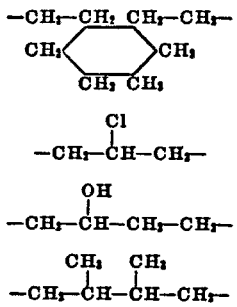

and the like.

Conjugated diethylenic compounds which can be reacted with the above-described cyclic peroxide compounds to produce the polyethylenic carboxlic acids include, among othres, the conjugated diolefins, such as those of 4 to 18 carbon atoms as 1,3 - butadiene, 1,3 - pentadiene, isoprene, dimethyl - 1,3 - butadiene, 1,3,5-hexatriene, 2-ethyl - 1,3 - pentadiene, 2,4-octadiene, 1,1-dimethyl-3-tertiary butyl-1,3-butadiene, 2-phenyl-1,3-butadiene, 1,4-diphenyl-1,3-butadine,2 - benzyl - 1,3-butadiene, 2-cyclohexyl-1,3-butadiene, 1,1 - diphenyl-3,5-hexadiene, cyclopentadiene, 1,3-cyclohexadiene, 1-methyl-2,4-cyclopentadiene, 2-methyl-1,3- cyclopentadiene, the mono- and di-methyl-1,3 - cyclohexadienes, 1 - vinyl-1-cyclohexene, 1-tertiary butyl-1,3-cyclohexadiene, and 1,3-cycloheptadiene are typical, and substitution products of such conjugated diolefins having as substituents functional groups such as hydroxy, nitro, cyano, carboxy, ester, ether and sulfone groups or halogen atoms. As halogenated conjugated diethylenic compounds, those containing one or more atoms of fluorine, chlorine and/or bromine are preferred. Representative examples of suitable halogenated conjugated diethylenic starting materials are chloroprene, 2,3-dichloro-1,3-butadiene, 1-chloro-2-methyl-1,3-butadiene, 2-chloro - 1,3 - pentadiene, 1-chloro-2,4-cyclopentadiene, 1-chloromethyl-2,4-cyclohexadiene, and the like. Other substituted conjugated diethylenic compounds which can be used successfully as starting materials are, for example, conjugated diethylenic alcohols such as 2,4-hexadien-1-ol, 1,3-hexadiene-5-ol, 2,4-octadiene-6-ol and 2,4,6-octatriene-1-ol, etc., ethers such as 2-methoxy-1,3-butadiene, 2-ethoxy-1,3-butadiene, 1-ethoxy-2,3-cyclohexadiene, etc., carboxylic acids of which vinyl acrylic acid, sorbic acid (2,4-hexadienoic acid), 4-methyl-2,4-pentadienoic acid, and muconic acid are typical, and esters of such acids, such as the methyl, ethyl, isopropyl, tertiary butyl, 2-ethylhexyl, decyl, and the like. 1-cyano-1,3-butadiene, 3-nitro-1,3-butadiene, 1-methylsulfonyl-1,3-butadiene, 3-vinyl-3-sulfolene, and the like, are examples of other suitable conjugated diethylenic compounds which may be used in the above-described process.

Preferred compounds having the conjugated system of double bonds to be used in the process are those of the formulae

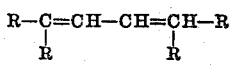

and

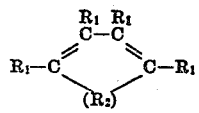

R and $R_1$ are members of the group consisting of hydrogen or hydrocarbon radicals, and preferably aliphatic hydrocarbon radicals containing from 1 to 8 carbon atoms and $R_2$ is a divalent alkylene group containing from 1 to 3 carbon atoms or a substituent derivative thereof which has one or more of the hydrogen atoms replaced by hydrocarbon radicals.

The proportions in which the cyclic peroxide and the compound possessing the conjugated system of double bonds are employed in the reaction may vary over a considerable range. In most cases, the peroxide and the compound possessing the conjugated system of double bonds will be employed in approximately equal molecular amounts, but larger or smaller amounts may be used as desired or necessary. Preferably, one mole of the peroxide will be reacted with from 1 to 2 moles of the compound possessing the conjugated system of double bonds.

The heavy metals, such as iron and cobalt, are employed in the reaction in at least equivalent amounts. The expression "equivalent amount" in this regard refers to that amount required for the formation of free radicals from one molecule of peroxide. The heavy metals are preferably employed in amounts varying from 1 to 1.5 equivalents.

In place of equivalent or excess amounts of the heavy metals, however, one can use smaller amounts of the metals together with a reducing agent which serves to convert the metal ions, such as ferric ions, back to ferrous ions as fast as they are formed. Examples of such reducing agents include 1-ascorbic acid, sodium formaldehyde, sulfoxylate, sodium bisulfite, reducing sugars and the like.

The reaction between the peroxide and the compound possessing the conjugated system of double bonds may be effected in water, solvents or emulsions. The reaction is preferably carried out in the presence of common solvents, such as methanol, ethanol, tertiary butanol, benzene, diethyl ether, methyl acetate, acetone, dioxane, and the like, or mixtures thereof or mixtures of these solvents with water.

The reaction is advantageously carried out under acidic conditions. It is usually desirable to add a part of the acid to a solution of the cyclic peroxide in the chosen solvent, about 0.5 to 2 equivalents of acid being suitable, and introduce the remaining acid, preferably about 0.5 to 2 equivalents of acid per mole of cyclic peroxide compound, with the reducing agent. Sulfuric acid is an economical and effective acidifying agent, but other acidic compounds, preferably inorganic acids, such as hydrochloric, phosphoric, and the life may be used.

Temperatures employed in the reaction between the peroxide and the compound possessing the conjugated system of double bonds may vary over a considerable range, but is generally maintained between about −15° C. to about 60° C. The temperature is preferably maintained between about −10° C. and 25° C. Pressures used may be atmospheric, superatmospheric or subatmospheric. While atmospheric pressure is generally preferred, it may be desirable to operate at higher pressures, such as, for example, when it is desired to maintain relatively volatile solvents in the liquid phase.

The use of the above-described process for the preparation of eicosadienedioic acid from 1,1'-dihydroxydicyclohexyl peroxide and butadiene is illustrated below:

EICOSADIENEDIOIC ACID

About 50 parts of a 34% hydrogen peroxide solution was added portionwise to 98 parts of cyclohexanone. The temperature was held below 40° C. by intermittent cooling. After completion of the addition, the mixture was allowed to stand at room temperature for an hour.

The 1,1'-dihydroxydicyclohexyl peroxide produced above was then dissolved in 750 parts of methanol containing 25 parts of concentrated sulfuric acid. The solution was cooled to 0° C. and 81 parts (1.5 moles) of butadiene dissolved therein. A solution of 147 parts (0.53 mole) of ferrous sulfate heptahydrate and 25 parts of concentrated sulfuric acid in 250 parts of water was added with stirring to the peroxide solution of 0° C. over a period of 1½ to 2 hours. After completion of the addition, the mixture was warmed to 65° C. and the excess butadiene removed. The mixture was then cooled, diluted with two liters of water and extracted with a 300-part portion of benzene. The benzene solution was dried over anhydrous sodium sulfate and distilled. The benzene and cyclohexanone were removed and then the bottoms boiled with a solution of sodium hydroxide for about three hours. Acidification of the alkaline solution liberated an oily solid which was taken up in benzene. The benzene solution was washed with water, dried and concentrated to a semi-solid residue. Analysis of the residue gave the following values:

|   | Found | Calculated for $C_{20}H_{34}O_4$ |
|---|---|---|
| C | 70.4 | 70.9. |
| H | 10.1 | 10.1. |
| Acidity | 0.59 eq./100 g | 0.59 eq./100 g. |
| Iodine No | 139 eq./100 g | 150 eq./100 g. |
| Hydroxyl value | 0.005 eq./100 g | 0. |

Recrystallization of the crude acid gave a straight chain isomer, M. P. 110–112° C. Hydrogenation gave the known eicosanedioic acid, M. P. 121–123° C.

Octadecadienedioic acid is prepared by a related method wherein the cyclohexanone is replaced by cyclopentanone.

Particularly preferred unsaturated polycarboxylic acids are the diethylenically unsaturated dicarboxylic acids containing at least 18 carbon atoms, and especially the diethylenically unsaturated dicarboxylic acids containing from 18 to 30 carbon atoms. Coming under special consideration, particularly because of their ease of preparation and fine properties of the resulting epoxidized products are the acids of the formula

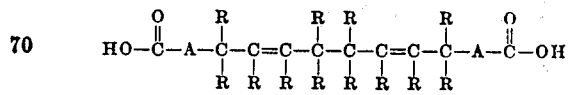

wherein A is a divalent hydrocarbon radical containing a chain of no more than 5 carbon atoms between the two valence bonds and having a total of no more than 12 carbon atoms, and R is a member of the group consisting of hydrogen, lower alkyls and chlorine, but preferably no more than 5 R's being chlorine. Still more preferred are the acids of the formula

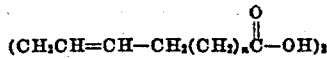

wherein $n$ is a whole number not more than 5.

The novel epoxidized polycarboxylic acids of the present invention which are obtained by epoxidizing the above-described unsaturated polycarboxylic acids may be exemplified by the following: 8,9,12,13-diepoxyeicosanedioic acid, 8-epoxyethyl-10,11-epoxyeicosanedioic acid, 7,8,11,12-diepoxyoctadecanedioic acid, 12-epoxyethyl-7-epoxyoctadecanedioic acid, 10,11-diethyl-8,9,12,13-diepoxyeicosanedioic acid, 6,7,10,11-diepoxyhexacanedioic acid, 7-epoxyethyl-9,10-epoxyhexadecanedioic acid, 1,2,4,5-diepoxycyclohexane-1,2-dicarboxylic acid, 3,4,5,6-diepoxycyclohexane-1,2-dicarboxylic acid, 2-(5,6,10,11-diepoxyoctadecyl)1,6-hexanedioic acid, 3,4,7,8-diepoxydecane-1,1,10-tricarboxylic acid, and 6,7,10,11-diepoxyhexadecanedioic acid.

The preferred epoxidized polycarboxylic acids which are obtained from the above-described polyethylenically unsaturated polycarboxylic acids may be exemplified by 10,11-dihexyl-8,9,12,13-diepoxyeicosanedioic acid, 7,8,11,12-diepoxyoctadecanedioic acid, 3,15-diamyl-8,9,12,13-diepoxyeicosanedioic acid, 10,11-diethyl-8,9,12,13-diepoxyeicosanedioic acid, and 3,15-dimethoxy-8,9,12,13-diepoxyeicosanedioic acid.

Valuable products having both an epoxy group and an unsaturated linkage are obtained by effecting only a partial epoxidation of the ethylenic linkages. Examples of these special products include, among others, 8,9-epoxy-12-eicosanedioic acid, 7,8-epoxy-11-octadecenedioic acid, 6,7-epoxy-10-hexadecenedioic acid, 3,4-epoxy-5-cyclohexene-1,2-dicarboxylic acid, and 10,11-dihexyl-8,9-epoxy-12-eicosenedioic acid.

Derivatives of the above-described ethylenically unsaturated polycarboxylic acids, such as their salts, esters and amides, may also be treated with the epoxidizing agent to form the corresponding epoxidized derivatives. Preferred derivatives to be used for this purpose include the amides and esters of the above-described unsaturated polycarboxylic acids such as, for example, dimethyl 8,12-eicosadienedioate, dibutyl 8-vinyl-10-eicosenedioate, dihexyl 7,11-octadecadienedioate, diamyl 7-vinyl-9-octadecenedioate, dimethyl 10,11-diethyl-8,12-eicosadienedioate, dimethyl 3,5-cyclohexadiene-1,2-dicarboxylate, dibutyl 1,4-cyclohexadiene-1,2-dicarboxylate, dibutyl 3-acetoxy-1,4-cyclohexadiene-1,2-dicarboxylate, dimethyl 5,10-octadecadienylsuccinate, and dimethyl 3-chloro-1,4-cyclohexadiene dicarboxylate.

These derivatives may be prepared from the above-described unsaturated polycarboxylic acids or many of them may be prepared by the methods used for the preparation of the acids themselves. Thus, the esters of the cyclic polyethylenically unsaturated dicarboxylic acids may be prepared by using the desired ester of maleic acid in place of the maleic acid or maleic acid anhydride in the above-described process. The esters of the polyethylenically unsaturated polycarboxylic acids obtained by the above-described reaction between the cyclic peroxide and the compound having the conjugated system of double bonds may be obtained by the above-described method by employing the desired alcohol as the solvent or by a related method wherein an ether-substituted cyclic peroxide such as those of the formula

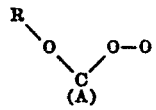

(A)

wherein R is a hydrocarbon radical, is used as the cyclic peroxide, or still further by reacting the acid produced by the above-described process with the alcohol in the presence of a suitable esterification catalyst, such as p-toluenesulfonic acid. The preparation of the dimethyl ester of eicosadienedioic acid is illustrated below:

DIMETHYL EICOSODIENEDIOATE 1,1'-dihydroxydicyclohexyl peroxide was prepared as shown in the above-described preparation of eicosadienedioic acid. The 1,1'-dihydroxydicyclohexyl peroxide was then dissolved in 750 parts of methanol containing 25 parts of concentrated sulfuric acid. The solution was cooled to 0° C. and 81 parts of butadiene then added. A solution of 147 parts of ferrous sulfate heptahydrate, 25 parts of concentrated sulfuric acid and 250 parts of water was slowly added to this mixture at 0° C. After completion of the addition, the mixture was warmed to 65° C. and the excess butadiene collected. The mixture was then cooled, diluted with water and extracted with benzene. The benzene solution was dried and distilled. After removal of benzene and cyclohexanone, the bottoms were dissolved in 300 parts of methanol containing 3 parts of p-toluenesulfonic acid catalyst and the mixture refluxed. After dilution with water and extraction with benzene, the benzene solution was washed and distilled to yield a viscous liquid having a B. P. 190°–220° C. (1 mm). Analysis of the residue gave the following values: Found: C, 71.6, H, 10.3, ester value 0.53 eq./100 g. Calculated: C, 72.1, H, 10.4, ester value 0.54 eq./100 g.

Dimethyl octadecadienedioate is produced by a related method wherein the 1,1'-dihydroxydicyclohexyl peroxide is replaced by 1,1'-dihydroxydicyclopentyl peroxide.

Particularly preferred ester derivatives of the unsaturated polycarboxylic acids are the esters of the above-described ethylenically unsaturated polycarboxylic acids and monohydric alcohols containing from 1 to 12 carbon atoms, and more preferably the aliphatic monohydric alcohols containing from 1 to 10 carbon atoms. Coming under special consideration, particularly because of their ease of preparation and fine properties of the resulting epoxidized products, are the esters of the alkanols containing no more than 8 carbon atoms.

The epoxidized derivatives obtained by epoxidizing the above-described esters may be exemplified by the following: dimethyl 8,9,12,13-diepoxyeicosanedioate, dibutyl 7,8,11,12-diepoxyoctadecanedioate, dioctyl 10,11-diethyl-8,9,12,13-diepoxyeicosanedioate, dihexyl 6,7,10,11-diepoxyhexadecanedioate, didecyl 8-epoxyethyl-10,11-epoxyoctadecanedioate, dibutyl 3-butyl-3,4,5,6-diepoxycyclohexane-1,2-dicarboxylate, dicyclohexyl 3,4,5,6-diepoxycyclohexane-1,2-dicarboxylate, dibenzyl 1,2,4,5-diepoxycyclohexane-1,2-dicarboxylate, diethyl 3-acetoxy-1,2,4,5-diepoxycyclohexane-1,2-dicarboxylate and diethyl 5,6,10,11-octadecylsuccinate.

The preferred epoxidized ester derivatives which are obtained from the above-described polyethylenically unsaturated polycarboxylic acids and the monohydric alcohols containing from 1 to 12 carbon atoms may be exemplified by dioctyl 10,11-dihexyl-8,9,12,13-diepoxyeicosanedioate, dibutyl 7, 8, 11, 12-diepoxyoctadecanedioate, dimethyl 10,11-diamyl-8,9,12,13-diepoxyeicosanedioate, dimethyl 8,9,12,13-diepoxyeicosanedioate and diamyl 8-epoxyethyl-10,11-epoxyoctadedecenedioate.

If the epoxidation is incomplete, as indicated hereinafter, the resulting products will contain ethylenic groups as well as epoxy groups. Examples of these special derivatives include, among others, dimethyl 8,9-epoxy-12-eicosenedioate, dioctyl 7,8-epoxy-11-octadecenedioate, dibutyl 6,7-epoxy-10-hexadecededioate, diamyl 11,12-epoxy-8-eicosenedioate and dihexyl 5,6-epoxy-8-tetradecenylsuccinate.

The amide derivatives of the polyethylenically unsaturated polycarboxylic acids to be epoxidized according to the process of the present invention may be prepared by methods similar to those described above for preparation of the acids and esters. The amides of the cyclic polyethylenically unsaturated dicarboxylic acids may be prepared, for example, by using the amides of the maleic acids in place of the maleic acid or maleic acid esters, or the amides may be prepared directly from the polyethylenically unsaturated polycarboxylic acids by reacting the acids with ammonia, ammonia salts or amines according to conventional methods.

Particularly preferred amide derivatives of the unsaturated polycarboxylic acids are the unsubstituted amides and the N-lower alkyl and N-lower alkenyl-substituted amides of the above-described acids, such as, for example, 8,12-eicosadienediamide, 8-vinyl-10-octadecenediamide, N,N'-dimethyl 8,12-eicosadienediamide, 10,11-diethyl-8,12-eicosadienediamide, N,N'-diamyl 8,12-eicosadienediamide, N,N'-diallyl 3,5-cyclohexadiene-1,2-dicarboxamide, 3,7-decadiene-1,1,10,10-tetracarboxamide, N,N'-diallyl 4,8-hexadecadienylsuccinamide, and N,N'-dicyclohexyl 8,12-eicosadienediamide.

The epoxidized derivatives obtaned by epoxidizing the above-described amides may be exemplified by the following: 8,9,12,13-diepoxyeicosanediamide, 8-epoxyethyl-10,11-epoxyoctadecanediamide, N,N'-dimethyl 8,9,12,13-diepoxyeicosanediamide, N,N'-diamyl 8,9,12,13-diepoxyeicosanediamide, N,N' - dicyclohexyl 8,9,12,13-eicosanediamide, 3,4,7,8-diepoxydecane - 1,1,10,10-tetracarboxamide, and N,N'-diethyl 3,4,5,6-diepoxycyclohexane-1,2-dicarboxamide.

The salt derivative of the polyethylenically unsaturated acids to be epoxidized are preferably prepared by treating the acids with the desired inorganic salts according to conventional methods. Salts that are particularly preferred are the salts of the acids and metals, such as cobalt, iron, manganese, lead, aluminum, nickel, iron, tin and vanadium.

The acid halides of the above-described acids may be obtained by reacting the acid with PCl₃ or SOCl₂ according to standard methods.

Ethylenically unsaturated compounds which may be epoxidized as described herein to produce products having structures somewhat related to those of the claimed acids and derivatives are those of the formula

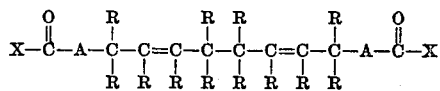

wherein X is a cyano group or a hydrocarbon radical, A is as described above, and R is hydrogen, halogen or hydrocarbon radicals. Such compounds may be obtained by the above-described process wherein a cyclic peroxide is reacted with a polyethylenically unsaturated compound. In this case, the cyclic peroxide would have the cyano group of hydrocarbon group substituted on the ring carbon atom bearing the peroxy group, such as those of the formulae

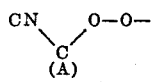

and

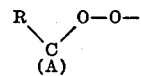

wherein R is a hydrocarbon radical.

The epoxidation of the above-described acids and/or their derivatives may be advantageously carried out by reacting the unsaturated products with an epoxidizing agent. Organic peracids, such as peracetic acid, perbenzoic acid, monoperphthalic acid and the like, are preferred agents for this reaction.

The amount of the epoxidizing agent employed will vary over a considerable range depending upon the type of product desired. In general, one should employ at least one mole of the oxidizing agent, such as perbenzoic acid, for every ethylenic group to be epoxidized. Thus, to produce monoepoxidized 8,10-eicosadienedioic acid, one should react one mole of the 8,10-eicosadienedioic acid with approximately one mole of perbenzoic acid. In some cases, it is rather difficult to effect epoxidation of all of the ethylenic groups and if a completely epoxidized product is required, additional epoxidizing agent and/or longer reaction periods may be required.

It is preferred to carry out the epoxidation reaction in a suitable mutual solvent for the reactants and product. Chloroform is an especially useful solvent for the purpose, but other materials such as ethyl ether, dichloromethane, benzene, ethyl acetate, etc., and the like, may be used. It is not necessary to operate under anhydrous conditions but the amount of water present should be limited so as to avoid excessive hydrolysis of the epoxy groups. Up to 25% water in the reaction mixture may be tolerated.

The temperature employed during the epoxidation may vary over a considerable range depending upon the type of reactants and oxidizing agents selected. It is generally desirable to maintain the temperature between —20° C. to 60° C., and more preferably, between 10° C. and 40° C. Atmospheric, superatmospheric or subatmospheric pressures may be employed as desired.

The epoxidized products obtained by this method may be recovered from the reaction mixture by any convenient means known to the art, such as distillation, extraction, fractional precipitation, filtration, and the like.

The novel epoxy-substituted polycarboxylic acids of the present invention are substantially colorless semisolids to crystalline solids having relatively high melting points and good solubility in a great many solvents and oils. As indicated above, the acids are particularly useful as additives for pesticidal and herbicidal compositions and in the preparation of improved alkyd resins.

The ester and amide derivatives of the epoxy-substituted polycarboxylic acids are generally obtained as substantially colorless liquids to semi-solids having a moderate to relatively high boiling point. They have excellent solubility and compatibility characteristics in relation to solvents, oils and synthetic resins and are useful as additives for lubricating compositions, greases, coating compositions, and the like. The amides and some of the esters are also useful as insecticides, fungicides and herbicides.

The esters and amides, however, are particularly valuable as stabilizers and flexibilizing agents for filmforming materials, such as the cellulose esters and ethers as, for example, cellulose nitrate, cellulose acetate, cellulose acetate butyrate, cellulose stearate, cellulose crotonate, ethyl cellulose, methyl cellulose, cellulose aceto-stearate and cellulose aceto-tartarate and the vinyl polymers, particularly the vinyl halide and vinylidene chloride polymers and their copolymers with monomers containing a $CH_2=C=$group, such as vinyl acetate, ethyl acrylate, and the like.

The derivatives that are of special value in this application are the esters of the exopidized polyethylenically unsaturated polycarboxylic acids and aliphatic monohydric alcohols containing from 1 to 10 carbon atoms, the unsubstituted amides and the N-lower alkyl-substituted amides of the epoxidized polyethylenically unsaturated polycarboxylic acids.

The amount of the novel esters and amides to be added to these compositions may vary over a wide range depending on the intended use of the finished product. In most cases, the amount of ester and amide added will vary from 10% to 150% by weight of the film-forming material, such as the cellulose esters and vinyl polymers. Preferred amounts vary from 20% to 80% by weight.

The incorporation of the novel esters and amides with the above-described materials may be accomplished by a variety of methods. In most instances, the ester and the film-forming material are mixed together in a solvent which is normally used for preparing the desired coatings, such as acetone, ethylene glycol, ethyl acetate, and the like, and then other desired materials, such as pigments, driers, ester gums, and the like, are added to complete the composition.

The compositions containing the novel esters and amides may be then applied to any surface, such as steel, wood, plaster and the like, by any suitable method, such as spraying, brushing or other methods. The solvents may be evaporated off at room temperature and the films dried to a hard coating, or the coatings may be baked by application of heat or by infra-red rays. In the latter case, very high temperatures may be used without discoloring the plasticized compositions.

The above-described epoxy-substituted polycarboxylic acids and their derivatives are also useful in the preparation of valuable polymeric products. For this purpose they may be polymerized by themselves or with other types of epoxy-containing materials. The homopolymers of the acids or derivatives containing only one epoxy group are preferably obtained by heating the monomers in the presence of catalysts, such as aluminum trichloride, boron trifluoride, and the like. About 1% to 10% of catalyst is generally sufficient to effect the desired degree of polymerization. It is generally preferred to accomplish the polymerization of this type in the presence of a solvent, such as petroleum ether, chloroform, benzene, isopropyl ether, and the like. The temperatures employed will generally vary between about 50° C. to 100° C. and more preferably between 20° C. and 60° C.

The polymerization of the novel epoxy-substituted acids or derivatives having a plurality of epoxy groups is preferably effected by heating the materials in the presence of an amine catalyst, such as triethylamine, ethylenediamine, 2,4,6-tri(dimethylaminomethyl)phenol, melamine and the like, but other epoxy-type catalysts, such as the boron trifluoride complex, may also be employed. Temperatures used for the polymerization generally vary from about 40° C. to about 100° C.

The properties of the polymers can be altered by copolymeriding them with other compounds. Thus, two or more different compounds of the invention may be copolymerized together, or they can be copolymerized with other types of epoxy-containing materials, such as ethylene oxide, propylene oxide, isobutylene epoxide, epichlorohydrin, vinyl cyclohexene dioxide, butadiene mono- or dioxide, epoxy ether, such as diglycidyl ether and glycidyl ethers of polyhydric phenols obtained by reacting a polyhydric phenol, such as bisphenol, with an excess of a halogen-containing epoxide, such as epichlorohydrin, in an alkaline medium, polyepoxy polyethers obtained by reacting, preferably in the presence of an acid-acting compound, such as hydrofluoric acid, a halogen-containing epoxide, such as epichlorohydrin, with a polyhydric alcohol, such as glycerol, ethylene glycol, hexanetriol, sorbitol, mannitol, pentaerythritol, polyglycerol, and the like, and subsequently treating the resulting product with an alkaline component to replace the epoxy group, and polyepoxide esters, such as di(2,3-epoxypropyl)phthalate, di(2,3-epoxy-propyl)adipate, and the like. The glycidyl polyethers of polyhydric phenols obtained by condensing polyhydric phenols with epichlorohydrin are also referred to as "ethoxyline" resins. See Chemical Week, vol. 69, page 27, for September 8, 1951.

If the novel epoxy-substituted acid or derivative possesses both an epoxy group or groups and an ethylenic linkage, such as may be obtained by partial epoxidation of the above-noted polyethylenically unsaturated acids or derivatives, valuable polymers may also be obtained by the addition of ethylenically unsaturated monomers, such as, for example, the vinyl monomers as vinyl chloride, acrylonitrile, methyl methacrylate, diallyl phthalate, vinyl acetate, vinyl pyridine, allyl acetate and styrene, and polymerizing the mixture in the presence of a free radical yielding catalyst, such as a peroxide as benzoyl peroxide. The resulting products may then be cured through the epoxy group by heating in the presence of epoxy-curing catalyst, such as the above-described amines.

The polymers prepared from the monoepoxy-substituted acids or derivatives find use in the preparation of coating compositions or as additives for lubricating compositions and the like. The homopolymers and copolymers prepared from the acids and derivatives having a plurality of epoxy groups or epoxy group and an ethylenic linkage are generally insoluble, infusible products and in the fusible, soluble form may be used in the formation of pottings, castings and rigid plastic articles or in the preparation of coating and impregnating compositions and the like.

To illustrate the manner in which the invention may be carried out, the following examples are given. It is to be understood, however, that the examples are for the purpose of illustration and the invention is not to be regarded as limited to any of the specific materials or conditions recited therein.

*Example I*

This example illustrates the preparation and some of the properties of epoxidized dimethyl eicosadienedioate.

About 100 parts of dimethyl eicosadienedioate, which was prepared as shown above, was added to 1000 parts of chloroform. 400 parts of a 27% peracetic acid solution was then added to the mixture and the resulting mixture allowed to stand at 0° C. to 10° C. for a few days. The product was then washed with ice water, cold 20% sodium hydroxide, ice water and then filtered through sodium sulfate. Chloroform was then taken off and the product concentrated to heavy colorless oil. Analaysis of the oil indicated that it was epoxidized dimethyl eicosadienedioate wherein both of the ethylenic groups had been converted to epoxy groups. Calculated for $C_{22}H_{38}O_6$: C 66.3, H 9.6. Found: C 66.5 and H 9.6.

The epoxidized dimethyl eicosadienedioate as produced above was found to be compatible with nitrocellulose and vinyl chloridevinyl acetate copolymers in all proportions. The vinyl chloridevinyl acetate copolymers and ½ sec. nitrocellulose were first added to methyl ethyl ketone to form solutions having 25% and 20% solids, respectively, and the dimethyl ester added to methyl ethyl ketone to form a solution having 60% solids. Portions of the solution of nitrocellulose end portions of the solution of vinyl chloride-vinyl acetate copolymer were then added to portions of the solution of the dimethyl ester so as to form compositions having the resin, i. e., the nitrocellulose or the vinyl chloride copolymer, and the dimethyl ester in the ratio of 9:1, 4:1, 1:1, 1:3 and 1:9. The resulting solutions were then spread on steel panels and air-dried. In all cases, the solutions dried to form clear compatible films. The films prepared from the solutions having the resin and dimethyl ester in ratios of 9:1, 4:1, and 1:1 were particularly outstanding as they were hard and had very good flexibility and stability. The vinyl chloride polymer films have increased stability to light and heat. Heating the epoxidized ester in the presence of 5% 2,4,6-tri(dimethylaminomethyl)phenol yields a tough resin.

*Example II*

This example illustrates the preparation and some of the properties of epoxidized eicosadienedioic acid.

About 100 parts of eicosadienedioic acid, which was prepared as shown above, was added to 1000 parts of chloroform. 380 parts of a 27% peracetic acid solution was then added to the mixture and the resulting mixture allowed to stand at 0° C. to 10° C. for a few days. The product was then washed with ice water and filtered through sodium sulfate. Chloroform was then taken off to yield the epoxidized eicosadienedioic acid. Analysis indicated that approximately both the ethylenic groups had been converted to epoxy groups.

50 parts of the epoxidized acid was heated with 2% boron trifluoride-phenol complex to form a hard solid polymeric acid.

About 50 parts of the epoxidized acid is mixed with 50 parts of diglycidyl ether and 5 parts of 2,4,6-tri(dimethylaminomethyl)phenol and the mixture heated to 65° C. to form a tough resin.

*Example III*

This example illustrates the preparation and properties of epoxidized dimethyl ester of octadienedioic acid.

About 100 parts of dimethyl octadecadienedioic acid, which is produced as shown above, is added to 1000 parts of chloroform. 400 parts of a 27% peracetic acid solution is then added to the mixture and the mixture allowed to stand at 0° C. to 10° C. for a few days. The product is then washed as shown in Example I. Chloroform is then taken off to yield the liquid epoxidized dimethyl octadecadienedioate. Analysis indicated that both of the ethylenic groups had been connected to epoxy groups. This ester also shows excellent compatibility characteristics with the cellulose esters and ethers and the vinyl chloride polymers.

Heating the epoxidized ester in the presence of 5% 2,4,6 - tri(dimethylaminomethyl)phenol yields a tough resin.

*Example IV*

This example illustrates the preparation of epoxidized eicosadienedioyl chloride.

About 376 parts of eicosadienedioyl chloride (in 1000 parts of chloroform) is treated with 280 parts of a 27% solution of peracetic acid. Analysis of the resulting product indicates that one of the ethylenic groups has been converted to an epoxy group.

*Example V*

About 100 parts of 4-methyl-1,2,4,5-cyclohexadiene-1,2-dicarboxylic acid from 2-chloro-4-methyl-1,2,4,5-cyclohexadiene-1,2-dicarboxylic acid is treated with peracetic acid in chloroform by the method shown in Example II. Analysis of the resulting product indicated that it is 4-methyl-1,2,4,5-diepoxycyclohexane-1,2-dicarboxylic acid.

*Example VI*

100 parts of N,N'-dibutyl eicosadienediamide prepared from eicosadienedioic acid and butyl amine is added to 1200 parts of chloroform and that mixture combined with 240 parts of 45% peracetic acid. The mixture is then stored in the cold for several days and then left at room temperature for seven hours. The mixture is washed with water, dilute carbonate solution, and again with water. After filtering through anhydrous sodium sulfate, the chloroform is removed on the steam bath to yield N,N'-dibutyl diepoxyeicosanediamide.

*Example VII*

About 25 parts of the partially epoxidized dimethyl eicosadienedioate produced in Example I is mixed with 10 parts of methyl methacrylate and 5 parts of benzoyl peroxide and the resulting mixture heated at 65° C. to form a viscous liquid. Approximately 5 parts of benzoyl peroxide and the resulting mixture were heated at 65° C. to form a viscous liquid. Approximately 5 parts of 2,4,6-tri(dimethylaminomethyl)phenol is then added and the mixture heated to produce a cross-linked resin.

*Example VIII*

Epoxidized octadecadienedioic acid is prepared by the method shown in Example II by treating octadecadienedioic acid with peracetic acid in chloroform. Analysis of the resulting product shows that both the ethylenic groups have been converted to epoxy groups.

We claim as our invention:

1. An epoxy-substituted compound of the group consisting of $C_{18}$ to $C_{30}$ open-chain polyethylenically unsaturated polycarboxylic acids having from 2 to 4 carboxyl groups and from 2 to 4 ethylenic groups and having at least one of the ethylenic groups in the acid moiety of the molecule at least one carbon atom but not more than 6 carbon atoms removed from a carboxyl group, converted to an epoxy group, and their acid chlorides, esters of these acids and hydrocarbon monohydric alcohols containing up to 12 carbon atoms, salts of these acids and cobalt, iron, manganese, lead, aluminum, nickel, iron, tin and vanadium, unsubstituted amides of these acids and the N-lower alkyl and N-lower alkenyl amides of these acids, the aforedescribed acids before expoxidization being obtainable by the reaction of approximately 1 mol of a cyclic peroxide with from about 1 to 2 mols of a compound containing a conjugated system of double bonds in the presence of iron and a reducing agent.

2. An epoxidized polyethylenically unsaturated polycarboxylic acid containing from 18 to 30 carbon atoms and of the formula

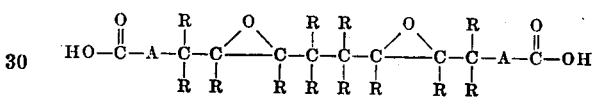

wherein A is a divalent hydrocarbon radical containing a chain of no more than 5 carbon atoms between the two valence bonds and R is a member of the group consisting of hydrogen, lower alkyls, and chlorine wherein not more than 5 R's are chlorine.

3. An epoxidized octadecadienedioic acid.
4. An amide of epoxidized eicosadienedioic acid.
5. Dimethyl 8,9,12,13-diepoxyeicosanedioate.
6. A polymer of a compound defined in claim 1 obtained by heating the compound in the presence of an amine curing agent.
7. A polymer of the epoxidized acid defined in claim 2 obtained by heating the compound in the presence of an amine curing agent.
8. A polymer of the epoxidized acid defined in claim 1 obtained by heating the compound in the presence of an amine curing agent.
9. A dialkyl diepoxyeicosanedioate wherein the alkyl groups contain no more than 12 carbon atoms.
10. An ester of an epoxyeicosanedioate and a hydrocarbon monohydric alcohol containing no more than 12 carbon atoms.
11. 8,9,12,13-diepoxyeicosanedioic acid.

References Cited in the file of this patent

UNITED STATES PATENTS

| | | |
|---|---|---|
| 2,671,064 | Cowell et al. | Mar. 2, 1954 |
| 2,680,109 | Stevens | June 1, 1954 |
| 2,757,192 | Jenner | July 31, 1956 |

OTHER REFERENCES

Swern et al., Journ.-Amer. Chem. Soc., vol. 70 (1948), pages 1228–1235.

Hackh's Chemical Dictionary, 3rd Edition (1944), McGraw-Hill, page 552, "muconic acid."

Swern, Chem. Reviews, vol. 45, Aug. 1949, pages 16–25.